United States Patent
Cai

(10) Patent No.: US 7,925,763 B2
(45) Date of Patent: Apr. 12, 2011

(54) KEEPING PERSISTENCE WHILE SWITCHING BETWEEN MODALITIES WHEN ACCESSING AN APPLICATION SERVICE IN A NETWORK

(75) Inventor: Hong Cai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 10/486,716

(22) PCT Filed: Jul. 8, 2002

(86) PCT No.: PCT/GB02/03121
§ 371 (c)(1),
(2), (4) Date: Jul. 19, 2004

(87) PCT Pub. No.: WO03/017089
PCT Pub. Date: Feb. 27, 2003

(65) Prior Publication Data
US 2005/0021767 A1  Jan. 27, 2005

(30) Foreign Application Priority Data
Aug. 13, 2001  (CN) .................................. 01 1 24795

(51) Int. Cl.
*G06F 15/16* (2006.01)
(52) U.S. Cl. .................................... 709/227; 709/219
(58) Field of Classification Search .................. 709/232, 709/200, 203, 205, 228, 219, 227; 705/1, 705/10
See application file for complete search history.

(56) References Cited

U.S. PATENT DOCUMENTS

| | | | | | |
|---|---|---|---|---|---|
| 4,124,889 A | * | 11/1978 | Kaufman et al. | ................. | 710/2 |
| 5,253,360 A | * | 10/1993 | Hayashi | .......................... | 714/16 |
| 5,483,658 A | * | 1/1996 | Grube et al. | ..................... | 726/29 |
| 5,515,373 A | * | 5/1996 | Lynch et al. | ..................... | 370/465 |
| 5,764,639 A | * | 6/1998 | Staples et al. | .................. | 370/401 |
| 5,790,977 A | * | 8/1998 | Ezekiel | .......................... | 702/122 |

(Continued)

FOREIGN PATENT DOCUMENTS
WO   WO 00/79391   12/2000

OTHER PUBLICATIONS

M. Cannataro et al., "An Object-Based Architecture for WAP-Complaint Applications," Proceedings of the 11th International Workshop on Database and Expert Systems Applications, (DEXA'00), 8 pages, Sep. 2000.

(Continued)

*Primary Examiner* — Jeffrey Pwu
*Assistant Examiner* — Shaq Taha
(74) *Attorney, Agent, or Firm* — William Stock, Esq.; Ryan, Mason & Lewis, LLP

(57) ABSTRACT

Disclosed is a method and device for keeping persistency while switching between modalities, which include: (1) searching out the last operation state of the application service accessed by the user from the user history, in response to a request for accessing an application service from a user; (2) connecting to the application service and continuing to execute the application service from the last operation state; (3) updating the last operation state in the user history based on the execution result of the application service. A user could flexibly selects different favorable terminal to continue with unfinished application service by adopting the invention.

19 Claims, 2 Drawing Sheets

U.S. PATENT DOCUMENTS

| | | | |
|---|---|---|---|
| 5,845,282 A * | 12/1998 | Alley et al. | 707/10 |
| 5,880,730 A * | 3/1999 | Durand | 715/846 |
| 6,049,831 A | 4/2000 | Gardell et al. | |
| 6,076,108 A | 6/2000 | Courts et al. | |
| 6,331,855 B1 * | 12/2001 | Schauser | 345/502 |
| 6,349,337 B1 * | 2/2002 | Parsons et al. | 709/227 |
| 6,358,892 B1 * | 3/2002 | Harrison et al. | 508/192 |
| 6,499,054 B1 * | 12/2002 | Hesselink et al. | 709/204 |
| 6,621,509 B1 * | 9/2003 | Eiref et al. | 715/836 |
| 6,701,334 B1 * | 3/2004 | Ye et al. | 1/1 |
| 6,772,205 B1 * | 8/2004 | Lavian et al. | 709/223 |
| 6,826,755 B1 * | 11/2004 | Kabir et al. | 718/108 |
| 2002/0057678 A1 * | 5/2002 | Jiang et al. | 370/353 |
| 2002/0075307 A1 * | 6/2002 | Alexander et al. | 345/760 |
| 2003/0009537 A1 * | 1/2003 | Wang | 709/219 |
| 2003/0093459 A1 * | 5/2003 | Dowling et al. | 709/201 |
| 2005/0246415 A1 * | 11/2005 | Belfiore et al. | 709/203 |

OTHER PUBLICATIONS

Welling et al., "Session Mobility Support for Multimedia Applications," Proceedings of the 1999 Multimedia Computer and Networking Conference, vol. 3654, pp. 52-63, Jan. 25, 1999.

* cited by examiner

KEEPING PERSISTENCE WHILE SWITCHING BETWEEN MODALITIES WHEN ACCESSING AN APPLICATION SERVICE IN A NETWORK

FIELD OF THE INVENTION

The invention relates to a method and apparatus for accessing an application service in a computer network.

BACKGROUND OF THE INVENTION

With the Internet becoming pervasive in every field of society, there appear more and more intelligent devices capable of processing information. These devices, for example, include PCs, mobile phones, palmtop computers, etc., most of which can be connected with a network to process information. Such a network is often referred to as a pervasive network. When a user accesses an application service, he/she prefers using one of those devices in one specific environment, for example using a PC to access the application service in the office, while using another different device in another specific environment, for example using a mobile phone to continue executing the application service in the car. That is to say, "keeping persistency" is required for the same application service even after switching from one device to another different device. However, for the current technology in accessing the same application service via multiple devices, a user can only be allowed to use one device to access the same application service from the beginning to the end. And if the user switches to another device to access the application service, he has to access the application service from scratch. The current technology does not solve the problem on how to keep persistency in this situation.

Nowadays, applications tend to become more and more modularized, but not a big packed module any more. An application may consist of a plurality of highly modularized independent components (hereinafter named application logic components). So the whole procedure to execute an application becomes to execute all the independent application logic components one by one. The present invention makes use of this modularization to solve the "persistency maintenance" issue.

SUMMARY OF THE INVENTION

An aim of the invention is to provide a method and device for keeping persistency while switching between modalities, so that a user using multiple terminal devices to access an application service can continue to execute the application service using device B from the last operation state point when using device A, instead of from scratch.

Users can use different terminal devices flexibly to continue to execute an unfinished application service by implementing the invention.

In a first aspect, the invention provides a method offering continuous service, which includes the following steps: (1) searching out the last operation state of the application service accessed by the user from the user history, in response to a request for accessing an application service from a user; (2) connecting to the application service and continuing to execute the application service from the last operation state; (3) updating the last operation state in the user history based on the execution result of the application service.

A second aspect of the invention also provides an apparatus for offering continuous service, which includes: means for searching out the last operation state of the application service accessed by the user from the user history in response to a request for accessing an application service from a user; means for connecting to the application service and continuing to execute the application service from the last operation state; means for updating the last operation state in the user history based on the execution result of the application service.

In a third aspect, the invention also provides a device offering continuous service, which includes a user history module for recording the historical call information of at least one user for at least one application service based on the user ID; a logon control module for identifying or verifying the user requesting for accessing an application service, retrieving the historical call information of the user for the application service from the user history module, and extracting the call ID of the last operation of the user for the application service from the historical call information; a session management module for connecting to the application service and executing the application service based on the historical call information, and for updating the historical call information recorded in the user history module based on the execution result; and a connection management module for setting up the connection to the session management module based on the extracted call ID.

In one embodiment, the start point for the next time to execute the same application will be determined based on the last operation state information recorded for all the application logic components of the application, when a modularized application is executed.

Embodiments of the invention will now be described, by way of example only, with reference to the accompanying drawings:

DETAILED DESCRIPTION OF THE INVENTION

Figure 1:
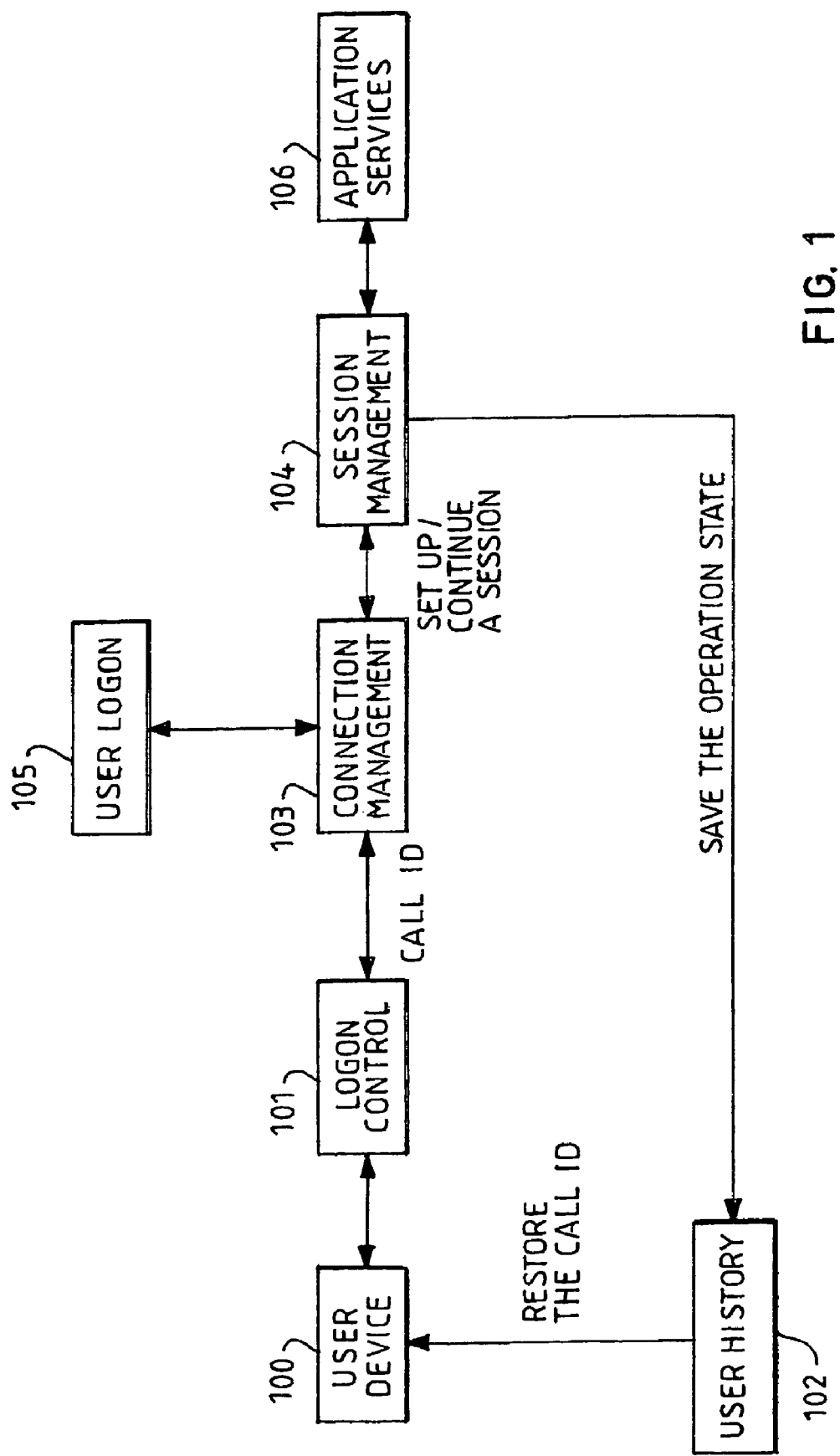
FIG. 1 is a block diagram showing the device for keeping persistency according to an embodiment of the invention.

As shown in FIG. 1, the device for keeping persistency comprises a logon control module 101 for identifying and verifying the user identification (user ID) of a user requesting an application service 106 from the user device 100. A user history module 102 records the historical call information of each of the users for their application services, respectively. The user history module 102 may record the historical call information of the users based on their user Ids. In addition, the logon control module 101 may search out the historical call information of certain user for a specific application service, from the user history module 102. And then the module 101 may extract the call ID of the last connection from the historical call information for the user, the call ID corresponding to the serial number of each application logic component in the application service 106. Furthermore, the logon control module 101 may accept the logon requests from various user devices 100 adopting various protocols, for example the device may be any device like mobile phone, palmtop computer, PC etc., the protocols may be WML, HTML, Notes client etc. A session management module 104 connects to the background application service 106 and executes the application logic components in the corresponding background application service continuously based on the call ID of the last connection extracted by the logon control module 101. A connection management module 103 sets up the connection to the session management module 104 based on the call ID extracted by the logon control module 101, and gets the information of the devices which the user usually uses to receive messages from the user register module 105 when required. In addition, the session management module 104 updates the historical call information recorded in the history module according to the execution result of the background application service 106, so that the call information can be used for the next access to the background application service. A user register module 105 stores each of the users' devices registering information, for example, in the form of script or database. The user register module 105 may register utility information about a user's several devices as follows:

800 AM~5:00 PM, telephone xxxxxxx is preferable;
       other time, mobile phone xxxxxx is preferable;
       if not found, try to use Instant Message;
          if still not found, and the service priority is high, contact the user's manager or college via enterprise name service (e.g. bluepage of IBM).

How to use the device to keep persistency will now be described in detail by reference to FIG. 2.

A. When a user uses one device to access an application service for the first time or access the application service again after completing an access to the same application service.

Suppose that user U uses a WAP mobile phone 100 to access an application service 106 via WML language, the process is as follows:

1. User U inputs his user account and password via WAP mobile phone 100, connects to the logon control module 101 and chooses the application service 106 that the system offers.

2. The logon control module 101 queries the user history module 102 to search out the last operation state of the application service 106 for user U.

3. The user history module 102 returns the logon control module 101 the information indicating the user U has not accessed the application service 106 before or the user has finished his access and needs to resume.

4. The logon control module 101 sends out a request to the connection management module 103, with the request including the user (i.e. user U) ID, the call ID, the application ID included in the call ID for the application service 106, and the call progress information (the call progress information here is initialized to be 0 or 1 because it's the first call). The request here is a general request independent of the user's device. For example, the information included in a typical request may have the format:

SERVICE http:/•/myservice.com/office/
    From: caihong@cn.ibm.com
    To: office@myservice.com
    CallID: 0_office@myservice.com
    Content Type: application/xml
    ContentLength:

5. Once the connection management module 103 receives the above request, it will extract the information about the user U (for example, the user ID) and the operation state information of the application service (for example, the call ID, the application ID and the call progress information), and sets up a new connection to the session management module 104.

6. The session management module 104 sets up a connection to the application service 106, executes the application service 106 from the initial state for the user U, and monitors the state of each of the application logic components of the application service 106, so as to get the operation state of the application service 106.

7. Each of the application logic components of the application service 106 returns its execution result to the connection management module 103.

8. The session management module 104 updates the call progress information of the application service 106 for the user U in the user history module 102, when one application logic component of the application service 106 is completed and another application logic component is going to be started.

9. The connection management module 103 then returns the execution result of application service 106 to the logon control module 101, and further returns to the user U.

The processes in the above steps 7-9 are based on an assumption, that is, this sort of application can be split into small application logic components which can be executed recursively until the user U issues an interrupt request or the execution of the application service 106 is finished. In addition, the persons skilled in the art will understand that the operation of the above step 8 is a sort of temporary operation, and that in order to save space and time, this step can be omitted.

10. When the user U sends out an interrupt request or the execution of the application service 106 is finished, the session management module 104 updates the call progress information in the user history module with the latest state of this operation, so as to make the user history module to always keep the latest operation state of the application service 106 for the user U.

11. When the connection management module 103 detects the interrupt request sent by the user U or detects that the execution of application service 106 is finished, it will notify the logon control module 101 that this operation ends.

The above description has shown the working process of the user U accessing the application service 106 for the first time. It can be seen from the above description that the operation state of the application service 106 for the user U is stored in the user history module 102. Next time the user U may continue to access the application service 106 from the point of the last operation state which is recorded in the user history module, and therefore the persistency can be kept.

In addition, in the above embodiment, the request in step 4 is a general request independent of the user device 100. So the session management module 104 executes the corresponding application logic component only based on the call progress information therein, which makes it possible for the user to use various terminal devices to access the same application service.

B. In the case of A, when the user stops using WAP mobile phone to access the application service 106 and switches to another device, for example a Lotus Notes Client to continue executing the application service, the working process is as follows:

1. The User U inputs the user account and password via Lotus Notes client 100, connects to the logon control module 101 and chooses the application service 106 offered by the system.

2. The logon control module 101 queries the user history module 102 to search out the last operation state of the application service 106 for the user U.

3. The user history module 102 returns the logon control module 101 the information indicating that the user has accessed the application service 106 before, as well as the last operation state of the application service 106 for the user, i.e., the operation progress information.

4. The logon control module 101 sends a request to the connection management module 103, the request comprising user (i.e. user U) ID, call ID, the ID included in the call ID for the application service 106, and the call progress information. The request here is a general request independent of the user device. The information for a typical request, for example, may have the format below:

SERVICE http://myservice.com/office/
From: caihong@cn.ibm.com
To: office@myservice.com
CallID: 01_office@myservice.com
Content Type: application/xml
ContentLength:

5. Once the connection management module 103 receives the above request, it will extract the information for the user (user U) and the last operation state of the application service, and sets up a new connection to the session management module 104.

6. The session management module 104 sets up a connection to the application service 106, continues to execute the application service 106 from the point of the last operation state for the user U, and monitors the state of each of the application logic components of the application service 106, so as to get the latest operation state of the application service 106.

7. Each of the application logic components of the application service 106 returns its execution result to the connection management module 103.

8. The session management module 104 updates the call progress information of the application service 106 for the user U in the user history module 102, when one application logic component of the application service 106 is ended up and another application logic component is going to be started.

9. The connection management module 103 then returns the execution result of application service 106 to the logon control module 101, and further returns the result to the user U.

In the above steps 7-9, the application service 106 can be split into application logic components which can be executed recursively until the user U sends out an interrupt request or the execution of the application service 106 is finished. In addition, since the operation of the above step 8 is a temporary operation, this step can be omitted in order to save space and time.

10. When the user U sends out an interrupt request or the execution of the application service 106 is finished, the session management module 104 updates the call progress information in the user history module with the latest operation state.

11. When the connection management module 103 detects an interrupt request sent by the user U or detects that the execution of application service 106 is finished, it will notify the logon control module 101 that this operation ends.

The above description has shown the working process of the user U continuing to access the application service. It can be seen from the above description that next time when the user U continues to access the application service 106, the application service 106 can be executed continuously based on the operation state stored in the user history module 102, and therefore the persistency can be kept. In addition, by changing the latest progress information in the user history module 102, the user history module always keeps the latest operation state of the application service for the user to start the next access. Therefore the persistency can be kept.

In addition, the request in step 4 is a device independent request, so the session management module 104 executes the corresponding application logic components only based on the call progress information therein, which makes it possible for the user to use various terminal devices to access the same application service.

In addition, although not illustrated, it is still understandable that the logon control module 101 returns the execution result of the application service in the communication way through which user U sends out the request in the above cases of A and B. For example the logon control module 101 returns the result to the user's WAP mobile phone in case A, and returns the result to the user's Lotus Notes Client in case B.

Another case will be described now, as the following
C. The Asynchronous Request from the User
When a user or an application service requires the successive procedure to be executed asynchronously, without specifying what kind of device to be used for receiving the execution result, the user register module 105 can be used to determine the right user device used to receive the execution result.

Specifically, the difference between the asynchronous and synchronous procedures lies in step 9.

Figure 2:
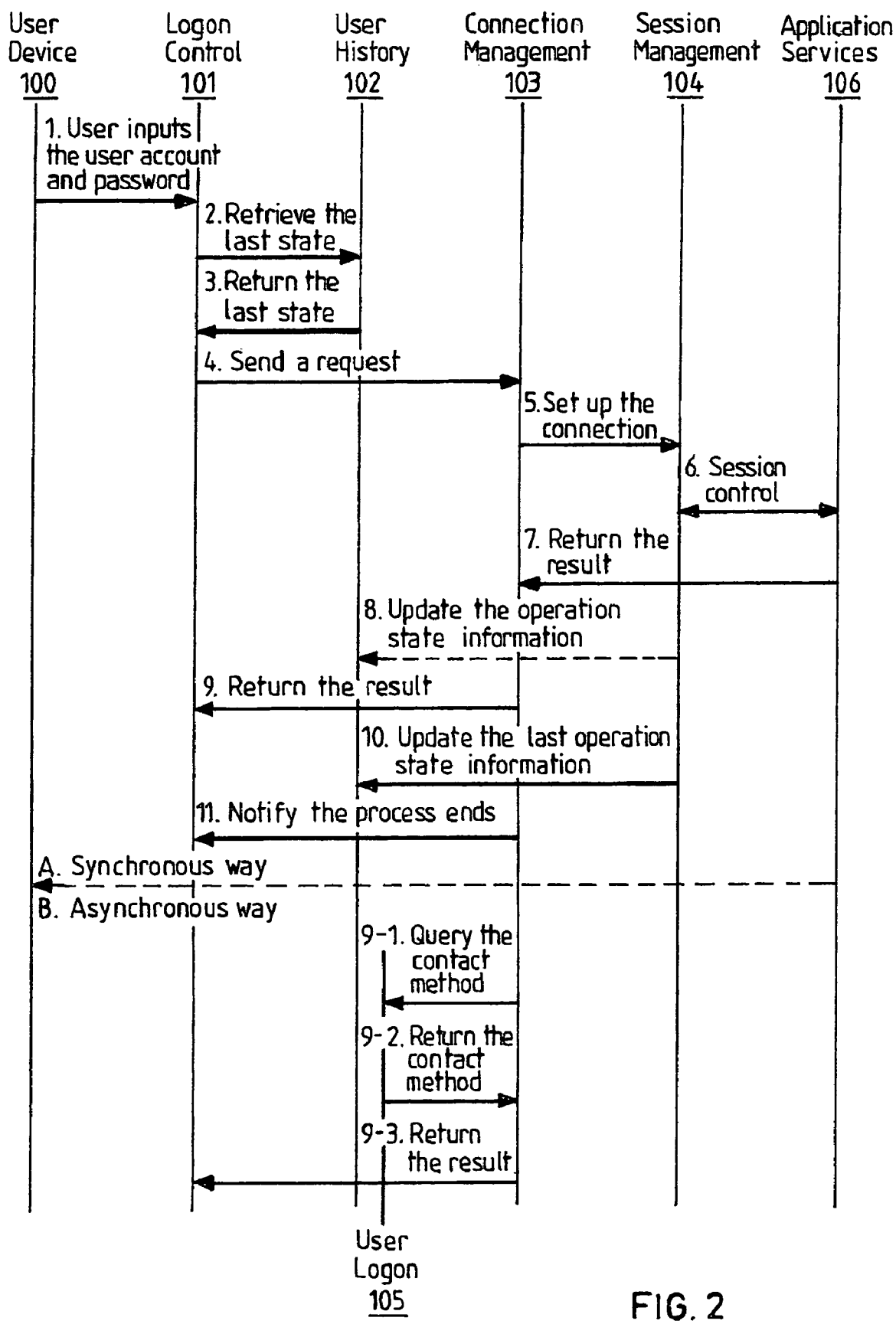
FIG. 2 is a processing flow chart of the above device.

As shown in FIG. 2, in asynchronous way:
9-1. The connection management module 103 calls the users register module 105 to determine the proper contact method to communicate with the user U.
9-2. The user register module 105 returns the proper contact method for the user U now to the connection management module 103.
9-3. The connection management module 103 sends out the execution result via the detected proper contact method to communicate with the user U.

Thus in asynchronous way, the invention also can always return the information to the user U in time.

The invention has been described with reference to the embodiments and the drawings which are not used to limit the invention. The invention can be modified and improved without departing from the scope of the claims.

The invention claimed is:

1. A method for accessing an application service in a network, the method comprising executing the following steps using a computer:
   obtaining from a user of a second device a user request to access a given application service, the given application service comprising a plurality of logic components independently generating respective execution results, each of the plurality of logic components having a respective state associated therewith, wherein the user previously accessed the given application service using a first device;
   in response to the user request to access the given application service, recalling from a user history a last operation state of the given application service attained when using the first device, the step of recalling further comprising the step of obtaining an ID associated with the last operation state, the ID corresponding to an identifier of one or more of the plurality of logic components of the given application service;
   connecting the user to the given application service and executing, in accordance with the ID, the one or more of the plurality of logic components of the given application service, wherein the user continues to access the given application service from the last operation state of the given application service;
   monitoring the respective states of each of the plurality of logic components of the given application service to determine a latest operation state of the given application service; and
   updating the last operation state in the user history based on the latest operation state of the given application service;
   wherein a given operation state of the given application service is determined based at least in part on the respective states of each of the logic components of the given application service.

2. The method according to claim 1 further comprising:
   returning an execution result of the given application service to the user using a contact method determined to be proper, the proper contact method being associated with a device pre-registered by the user that is used by the user during a pre-defined time period.

3. The method according to claim 2, wherein the contact method is that which is used by the user when requesting access to the given application service.

4. The method according to claim 2, wherein the contact method is selected from a plurality of contact methods pre-registered by the user.

5. Apparatus for providing access to an application service in a network, the apparatus comprising:
at least one computer based device operative to:
obtain from a user of a second device a user request to access a given application service, the given application service comprising a plurality of logic components independently generating respective execution results, each of the plurality of logic components having a respective state associated therewith, wherein the user previously accessed the given application service using a first device;
recall from a user history a last operation state of the given application service attained when using the first device, in response to the user request to access the given application service, such that in the operation of recalling, the at least one computer based device is further operative to obtain an ID associated with the last operation state, the ID corresponding to an identifier of one or more of the plurality of logic components of the given application service;
connect the user to the given application service and execute, in accordance with the ID, the one or more of the plurality of logic components of the given application service, wherein the user continues to access the given application service from the last operation state of the given application service;
monitor a state of each of the plurality of logic components of the given application service to determine a latest operation state of the given application service; and
update the last operation state in the user history based on the latest operation state of the given application service;
wherein a given operation state of the given application service is determined based at least in part on the respective states of each of the logic components of the given application service.

6. The apparatus according to claim 5, wherein the at least one computer based device is further operative to
present an execution result of the given application service to the user using a contact method determined to be proper, the proper contact method being associated with a device pre-registered by the user that is used by the user during a pre-defined time period.

7. The apparatus according to claim 6, wherein the contact method is that which is used by the user when requesting access to the given application service.

8. The apparatus according to claim 6, wherein the contact method is selected from a plurality of contact methods pre-registered by the user.

9. A system for keeping persistency in a computer network comprising:
a user history module for recording the historical call information of at least one user for at least a given application service based on the user ID, the given application service comprising a plurality of logic components independently generating respective execution results, each of the plurality of logic components having a respective state associated therewith;
logon control module for: identifying or verifying the user requesting access to the given application service, the user using a second device, wherein the user previously accessed the given application service using a first device; retrieving from the user history module the historical call information of the user for the given application service attained when using the first device; and extracting an ID of a last operation of the user for the given application service from the historical call information, the ID corresponding to an identifier of one or more of the plurality of logic components of the given application service;
a session management module for: connecting the user using a second device to the given application service and executing the one or more of the plurality of logic components of the given application service based on the ID from the historical call information, wherein the user continues to access the given application service from the last operation of the given application service; monitoring respective states of each of the plurality of logic components of the given application service to determine a latest operation state of the given application service; and updating the historical call information recorded in the user history module based on the latest operation state of the given application service; and
a connection management module, for setting up the connection to the session management module based on the extracted ID;
wherein a given operation state of the given application service is determined based at least in part on the respective states of each of the logic components of the given application service.

10. The system according to claim 9, further comprising:
a user registrar module for registering information on at least one device used by a user for connection, the information comprising a device contact time period, the connection management module being operable to select one device from the user register module for the user to receive an execution result of the given application service.

11. The system according to claim 10, further comprising: means for presenting the execution result to the selected device.

12. The system according to claim 11, wherein a terminal is used by the user when requesting access to the given application service.

13. The system according to claim 11, wherein the device is selected from a plurality of terminals pre-registered by the user.

14. The method of claim 1, wherein the ID corresponds to a serial number of one or more of the plurality of logic components of the given application service.

15. The apparatus of claim 5, wherein the ID corresponds to a serial number of one or more of the plurality of logic components of the given application service.

16. The system of claim 9, wherein the ID corresponds to a serial number of one or more of the plurality of logic components of the given application service.

17. The method of claim 1, wherein the logic components of the application service are executed recursively until the user issues an interrupt request or the application service finishes executing.

18. The apparatus of claim 5, wherein the logic components of the application service are executed recursively until the user issues an interrupt request or the application service finishes executing.

19. The system of claim 9, wherein the logic components of the application service are executed recursively until the user issues an interrupt request or the application service finishes executing.

* * * * *